United States Patent [19]
Roach

[11] 3,833,785
[45] Sept. 3, 1974

[54] ELECTRODE MOVEMENT CONTROL
[75] Inventor: Jere H. Roach, Rocky River, Ohio
[73] Assignee: Cammann Manufacturing Company, Cleveland, Ohio
[22] Filed: July 2, 1973
[21] Appl. No.: 375,800

[52] U.S. Cl. .............................. 219/69 G, 219/69 V
[51] Int. Cl. ............................................ B23k 9/16
[58] Field of Search ............. 219/69 G, 69 V, 69 M

[56] References Cited
UNITED STATES PATENTS
3,287,537  11/1966  Chenel ............................ 219/69 G
3,289,029  11/1966  Webb ........................... 219/69 G X

*Primary Examiner*—E. A. Goldberg
*Assistant Examiner*—Hugh D. Jaeger
*Attorney, Agent, or Firm*—Woodling, Krost, Granger & Rust

[57] ABSTRACT

An electrode movement control is disclosed for an electric arc disintegrator to disintegrate an aperture into a workpiece. The electrode is held in a chuck in an electrode head which can move along an axis to move the electrode toward or away from the workpiece. Current supply means supplies current for an electric arc to disintegrate particles from the workpiece. A vibrator moves the head in a vibratory movement primarily toward the workpiece, and a fluid motor such as an air pressure cylinder and piston is connected to move the electrode head away from the workpiece whenever a current sensing transformer senses arc current in excess of a predetermined amount. The fluid motor is also controlled normally to balance the weight of the electrode head and optionally can be made to move the electrode head toward the workpiece if the head is beneath the workpiece.

12 Claims, 1 Drawing Figure

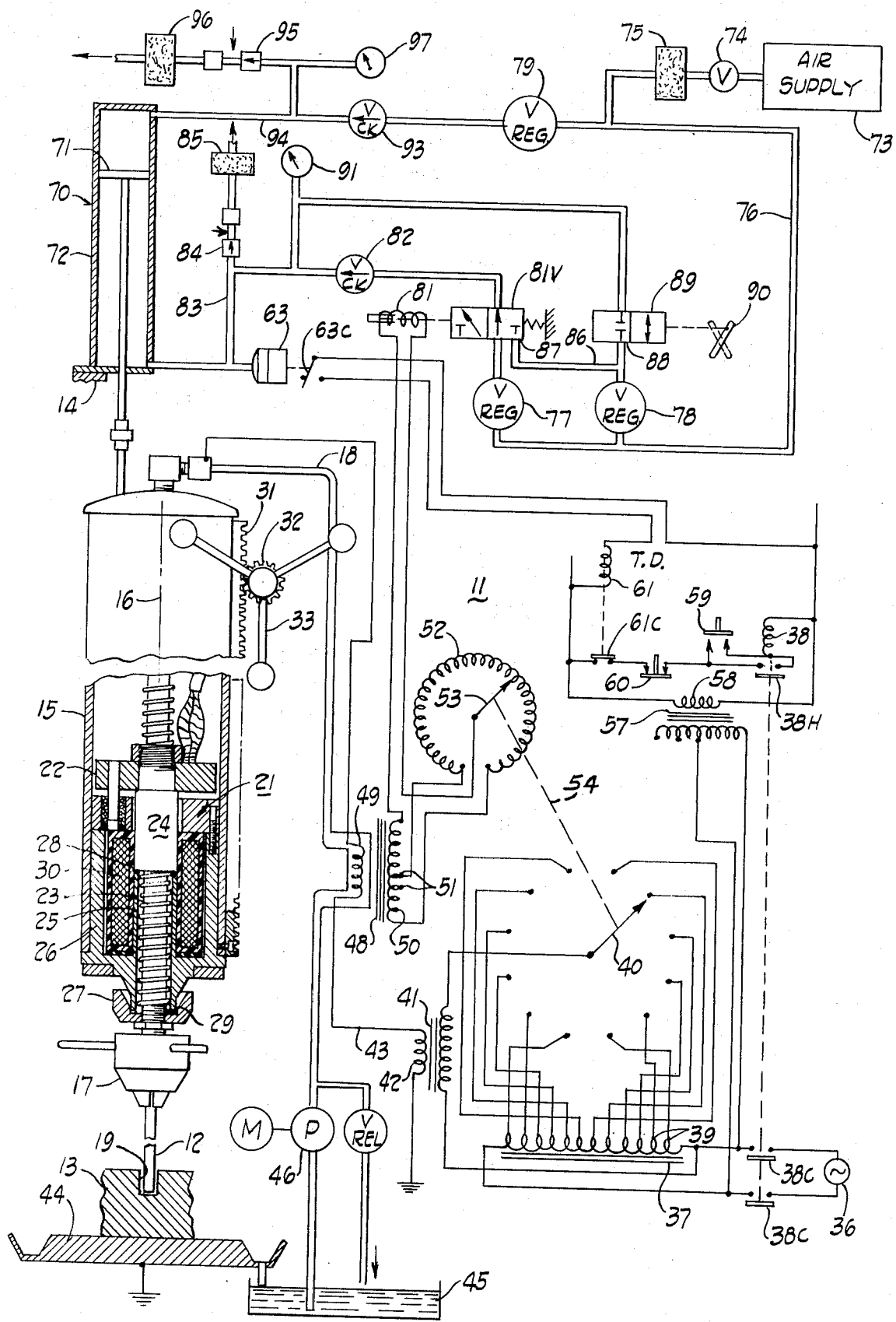

ELECTRODE MOVEMENT CONTROL

BACKGROUND OF THE INVENTION

The present invention relates to electrode movement control in an electric arc discharge apparatus. Broadly speaking this electric arc discharge apparatus includes electric welders and cutters. Servomotor control of the feed of an electrode has been used before in electric welders and cutters. In the field of arc disintegrators, however, such control systems previously have been found to be inoperable. Such servomotor controls have the three disadvantages, so far as disintegrators are concerned, of being expensive, operating on high fluid pressures, and relying on a coated electrode. Typical fluid pressures in oil cylinders or air oil cylinders are about 100 pounds per square inch which has been found to be excessive for the slow movements required in disintegrators. Only about 15 pounds per square inch of air pressure is needed on a metal arc disintegrator, whereas the typical piston and cylinder assembly has too much friction to successfully operate on only 15 pounds per square inch pressure. Also the rate of flow of the fluid on the typical welder cylinder motor is far in excess of that which is practicable with disintegration. In the order of 1/4 cubic inches of fluid per minute is all that is required, and this is too small a rate of flow in the known prior art devices to control disintegrators. Still further, the typical welder relies upon a coating on the surface of a solid electrode to stabilize and maintain the arc despite varying electrode to workpiece distances.

The arc disintegration of metal workpieces has two additional problems not found in the typical control of a welder; namely, the aqueous coolant through the hollow electrode and the typical vibrator acting on the electrode to cause a formation of arcs between the electrode and the workpiece which arcs separate particles from the workpiece to be carried away by the coolant. The use of an aqueous coolant has called for a hollow tubular electrode which so far has precluded use of a coating on the electrode for arc stabilization. Also the vibrator on the electrode has been found to be important in proper operation of the disintegrator. For these reasons the typical servomotor control of a welder has been found to be inapplicable to the electrode feed in an arc disintegrator.

Accordingly, an object of the invention is to obviate the above mentioned disadvantages.

Another object of the invention is to provide a metal arc disintegrator which will establish an automatic feed of the electrode toward the work and an automatic retract away from the work upon excessive current.

Another object of the invention is to provide a metal arc disintegrator where the electrode head may be balanced for controlled movement, may be vibrationally moved toward a workpiece, and yet will have rapid retract movement away from the workpiece should the arc current become excessive.

Another object of the invention is to provide an arc disintegrator electrode feed control with a timer to interrupt arc current after a time interval should a short circuit occur.

Another object of the invention is to provide a metal arc disintegrator with an electrode feed control capable of feeding downwardly or feeding upwardly toward the underside of a workpiece.

Another object of the invention is to provide an air pressure motor with low friction and which operates with small amounts of air pressure and of air flow yet will quickly retract an electrode upon excessive currents.

SUMMARY OF THE INVENTION

The invention may be incorporated in an electrode movement control for an electric arc discharge apparatus comprising in combination, a frame, means mounting an electrode for movement in said frame, means to supply electric arc current to said electrode and through said electrode to arc to a workpiece, first means urging said electrode mounting means in a first direction toward a workpiece, second means urging said electrode mounting means in a second direction away from a workpiece, at least one of said urging means including a fluid pressure motor connected to said electrode mounting means, one of said urging means including means supplying fluid under pressure to said motor to urge said mounting means in one of said directions, means responsive to the current exceeding a predetermined magnitude, and control means having an input from said current responsive means and connected to control said motor to effect a retraction of said electrode from the workpiece upon the arc current exceeding said predetermined magnitude.

Other objects and a fuller understanding of the invention may be had by referring to the following description and claims, taken in conjunction with the accompanying drawing.

BRIEF DESCRIPTION OF THE DRAWING

The single FIGURE is a schematic electrical and fluid diagram of a metal arc disintegrator incorporating the invention.

DESCRIPTION OF THE PREFERRED EMBODIMENT

The drawing shows an arc disintegrator 11 which broadly may be classed as electric arc discharge apparatus. This disintegrator 11 uses an electrode 12 to establish an arc relative to a workpiece 13. Such electric arc discharge apparatus may be used for welding or cutting on the workpiece 13 and in the preferred embodiment is used for a cutting operation known as metal disintegration. The arc disintegrator 11 includes a frame 14 on which an electrode head 15 is mounted for reciprocation along an axis 16. Any conventional means may be used for mounting and guiding the head 15 along this axis. The head 15 carries an electrode mounting means typically a chuck 17 in which the electrode 12 may be chucked along the axis 16. Typically the electrode 12 is hollow and is supplied with an aqueous coolant through the head 15 from a coolant supply tube 18. This liquid coolant has the dual functions of cooling the electrode 12 to keep it from melting away too rapidly and of flushing the disintegrated particles out of the aperture 19 which is being disintegrated into the workpiece.

The electrode head 15 includes a vibrator 21 which includes generally an armature 22 supported on a compression spring 23 which surrounds a shaft 24 fixed to the armature 22. The spring 23 is inside a metal cup 25, the bottom of which is unitary with a casting 26 which is the main part of the electrode head 15. The lower end of the shaft 24 is threaded, and a gap adjusting nut 27 is threaded on this shaft to adjust the gap at 28 between the lower end of the armature shaft and the upper surface of the cup 25. The spring 23 normally urges the armature 22 so that the gap nut 27 is against a shoulder 29 on the casting 26. A solenoid coil 30 surrounds the armature 22 and when energized, urges the armature 22 downwardly to impact against the top edge of the cup 25. Alternating or preferably half-wave rectified 60 Hz. voltage is that which energizes the coil 30. This causes the armature 22 to vibrate up and down at this 60 Hz. rate. It impacts the cup 25 on the downward stroke and the casting shoulder 29 on the upward stroke giving primarily a downward force to move the electrode head 15 and electrode 12 downwardly in a vibratory motion until the end of the electrode 12 strikes the workpiece 13. At such time, the vibratory downward force continues, but the movement of the head 15 stops since the impacts are now being directed onto the workpiece.

The electrode head 15 may be provided with a rack 31 engaged by a pinion 32. A hand wheel 33 may be provided with a friction lock, not shown, and may turn this pinion 32 to manually advance and retract the electrode head 15.

A suitable power source 36 such as single phase 60 Hz. 220 or 440 volts supplies an autotransformer 37 through main contactors 38C. The autotransformer 37 is in a power circuit for arc current and has taps 39 thereon contactable by a tap switch 40 to connect a variable amount of voltage to a cutting transformer 41. This is a step-down transformer to supply a low voltage from the secondary 42 through a conductor 43 through the head 15 and through the hollow electrode 12 to the workpiece 13. Alternatively, the current may pass through the flexible hollow conductor 18 which is also the coolant supply tube. This aqueous coolant returns to the work table 44 and to a coolant tank 45 from where it is pumped from a pump 46 to again cool the electrode 12. A sensing transformer 48 has a water-cooled primary 49 connected in series between the cutting transformer secondary 42 and the coolant supply tube 18. This sensing transformer 48 has a secondary 50 with multiple taps 51 for suitable selection of a sensing voltage applied to a variable transformer 52. This variable voltage is obtainable from the variable transformer at a moving arm 53 which also could be a tap switch on the taps 51 of the sensing transformer secondary 50. This moving arm may be individually movable or, as shown, may be ganged by a mechanical connection 54 to the tap switch 40 of the autotransformer 37.

The power source 36 also energizes a control transformer 57. A secondary 58 of this transformer energizes a main contactor coil 38 which when energized closes the contacts 38C to supply power to the autotransformer 37. Also the contacts 38H are closed as holding contacts upon energization of the coil 38, for example by closing of the manual push button contacts 59 which is a starter switch. A stop switch 60 will deenergize the coil 38. A timer relay 61 is also energized from the secondary 58 upon closing of pressure switch contacts 63C. When energized, the timer relay 61 opens normally closed timer contacts, after a time delay, 61C which are in series with the main contactor coil 38.

The arc disintegrator 11 is provided with an electrode movement control to control movement of the electrode 12 in two directions: a first direction toward the workpiece 13 and a second direction away from the workpiece. This electrode movement control includes a fluid motor 70. This fluid motor 70 is shown as a piston 71 inside a cylinder 72. The cylinder is mounted on the frame 14, and the piston 71 is connected to move the head 15. By this means it moves the electrode mounting means 17 and hence the electrode 12. A fluid pressure supply is shown as an air supply source 73 which is connected through a manual shutoff valve 74 and a filter 75 to a pressure line 76. First, second, and third variable pressure regulators 77, 78, and 79 are connected to this pressure line 76.

The first pressure regulator 77 is connected from pressure line 76 through a solenoid actuated selector valve 81V, a check valve 82 and a conduit 83 to the lower end of the cylinder 72. A variable restriction air bleed 84 and an air muffler or filter 85 are also connected to this lower end of the cylinder 72. The second variable pressure regulator 78 is connected from pressure line 76 to a conduit 86 which leads to an input 87 of the selector valve 81V and also leads to an input 88 of a manual valve 89. A handle 90 may actuate the manual valve 89 between up and down positions. The outlet of the manual valve 89 is to the conduit 83. The pressure actuated switch 63 is connected to this conduit 83 and also a pressure gauge 91 may be connected to this conduit 83.

The third pressure regulator 79 is connected from the pressure line 76 through a check valve 93 to a conduit 94 which leads to the upper end of the cylinder 72. Also connected to this conduit 94 is a variable air bleed 95 and an air muffler or filter 96. A pressure gauge 97 may also be connected to this conduit 94. Solenoid coil 81 is connected in circuit with the variable transformer 52 and with part of the sensing transformer secondary 50.

Operation

The arc disintegrator 11 may be used to disintegrate an aperture into a metallic workpiece by action of an arc struck between the electrode 12 and the workpiece 13. Where, as shown in the drawing, the head 15 is above the workpiece, this head is set to feed downwardly and will retract upwardly upon arc current in excess of a predetermined value. In order to place the arc disintegrator into operation, first the head is mechanically locked by any means such as a friction lock on handwheel 33, to keep it from falling. If there is any spring counterbalance on the head, this may be removed or its force lessened so that the head 15 tends to fall by gravity. The valve 74 is opened so that air pressure will appear in the pressure line 76. The manual valve 90 is next turned to the down position shown in full lines on the drawing at which point the input 88 is closed. The first variable pressure regulator 77 is next adjusted to supply enough force on the bottom of the piston 71 to balance the weight of the head 15, chuck 17, and the electrode 12. The clamp on the head 15 will, of course, be released in order to determine this balance condition. In one arc disintegrator unit constructed in accordance with this invention, this was about 15 pounds per square inch on the bottom of the piston 71. Next, the manual valve 89 is moved from the position shown to the up position shown in dotted lines of the handle 90. The second pressure regulator 78 is then adjusted to provide enough force to quickly raise the head 15 to the end of its stroke. This may be at any desired rate, for example 1 to 2 seconds for the entire stroke of the piston 71. The variable air bleed 95 may be set to choke off air flow so that this rate of movement is not too great and to provide a cushioning effect as the piston reaches the end of the cylinder 72. Again in one arc disintegrator constructed according to the invention, this was about 40 psi setting of the pressure regulator 78. Next, the third pressure regulator 79 should be set at some value considerably lower than that of the first and second pressure regulators. For the example given of 15 and 40 psi for the first and second regulators, the third regulator 79 should be set for example at 2 psi or in the range of 1 to 5 psi. This gives a small value downward force on the piston 71 to help overcome any frictional resistance.

Next the manual valve should be set in the down position and any clamp on the head 15 should be released. The head should be moved manually from the top to the bottom of the stroke to determine that the head has a feel of being balanced except for friction. Also the mechanical connection between the piston 71 and the head 15 should be free for movement throughout the stroke. Next all preparations for cutting on the workpiece should be made including positioning of the work and clamping to the work table, positioning of the electrode, selecting the setting for the vibrator 21, and the setting for the arc current power at the tap switch 40. Also the vibrator and coolant pump selector switch should be turned on. Next, with the manual valve 89 in the down position and while holding the handwheel 33 so that the electrode 12 is about a quarter inch above the point to be cut, the start button 59 is pressed and after the coolant begins to flow out of the end of the electrode, the handwheel 33 may be released. The vibrator 21 will then give primarily a downward force and gradually feed the electrode toward the workpiece 13. The cut of the workpiece will start when the electrode contacts the work. This will cause arcing to the workpiece with the arcs interrupted at the 60 Hz. rate of the supply voltage. Assuming for the moment that the sensitivity range setting of the transformer arm 53 is correct, the solenoid valve 81V will not be actuated. The arcs will disintegrate or separate small particles from the workpiece, flushed away by the coolant, as the vibrator gradually feeds the electrode toward the workpiece at the same rate as a hole is gradually formed in the workpiece.

If the setting of the transformer arm 53 is at too high a sensitivity range, i.e., too far clockwise, then pulses of current are impressed on the solenoid valve coil 81 to slightly actuate the valve 81V during large current pulses of the varying arc current. If the electrode tends to momentarily weld itself to the workpiece, or a metal particle gets stuck between the electrode and the side of the aperture 19, this will make an instantaneous short circuit on the cutting transformer secondary 42. This heavy current will be sensed by the sensing transformer 48 which will give a large pulse of current to the solenoid actuating coil 81. This pulls the valve spool of valve 81V to the right as viewed in the drawing and accordingly high pressure air from the conduit 86 will now flow through the selector valve 81V and conduit 83 to the lower end of the cylinder 72. This quickly retracts the electrode 12 from the workpiece 13. This arc varies in intensity due to the action of the vibrator 21. The vibratory action is a relatively small amount in the order of 0.005 to 0.020 inches. Experience has shown that this vibratory action is helpful in the actual disintegration of metal particles from the workpiece 13. However, due to this vibratory action the arc intensity varies and the sensing transformer 50 will pick up a variable amount of voltage to be impressed upon the solenoid coil 81. The sensing transformer 50 is a current transformer and such a current sensing device sensing the arc current may be placed in many different electrical and physical locations in the arc disintegrator 11. For example, it may be a loop surrounding the conductor, either a fixed or a flexible conductor, in most any location between ground and the actual arc at the end of electrode 12.

Small particles which may be of sizes of 0.001 up to 0.020 inches in diameter are knocked off the workpiece as the arc is struck to the closest adjacent projection of the workpiece. The coolant not only keeps the electrode cool and keeps it from melting, but also flushes the metal particles out of the aperture 19 which is being formed by the arc disintegration. The moving arm 53 sets the sensitivity of the solenoid coil 81. Accordingly, this sets a predetermined value for the current sensitivity. If the arc current should exceed this predetermined value, then the solenoid valve is actuated to cause the retraction of the electrode 12. As a practical matter, this arc current varies considerably and the solenoid valve 81 in this invention is quick to respond, actually having a slight dither back and forth between the two positions at which low pressure air is supplied for counterbalancing the head and high pressure air is supplied for retraction of the head 15. The low friction of the piston 71 within the cylinder 72 permits the head 15 to be rapidly moved and to be moved with only a small air pressure and with a small flow of air. The variable restriction air bleed 84 is provided so that the pressure regulator 77 is always working a small amount to provide proper orientation thereof. Also this air bleed 84 provides a place for air to escape as the head 15 gradually moves downwardly during the disintegration process. The variable air bleed 95 provides the afore-mentioned air cushion as the piston retracts against the end of the cylinder 72 and also permits a place for the air to escape during the intermittent upward movement of the piston 71 during normal dithering operation of the selector valve 81.

The setting of the tap switch 40 is chosen to take care of different size electrodes and different ampere settings desired for the disintegrating operation. As the tap switch 40 is moved in a counterclockwise direction, this increases the amount of voltage supplied to the cutting transformer 41 and hence increases the amperage available for the arc current. The moving arm 53 adjusts the sensitivity of the solenoid actuated selector valve 81V and is generally necessary because of the variable settings available by the tap switch 40. It will be appreciated that with increased current through the sensing transformer primary 49, more voltage will be developed on the secondary taps 51 of this sensing transformer 50. Accordingly, the moving arm 53 when moved counterclockwise, provides a smaller percentage of the voltage from the variable transformer 52 as applied to the solenoid coil 81. There is a minimum voltage applied to the solenoid coil 81 from the secondary 50 of the sensing transformer and this is to make sure that the solenoid selector valve 81V will always actuate at the highest power setting of the tap switch 40 which is the minimum setting of the moving arm 53.

In many cases the workpiece 13 is large and the electrode 12 must work inside an aperture which is not vertical. For example, one might be burning away a broken drill or tap inside an existing hole. If this hole is not vertical, then the head 15 must be adjusted to the proper orientation. In many cases, the head must work upwardly against the underside of the workpiece 13. In which case the third pressure regulator 79 has an alternative function. The head 15 is set in the proper orientation and the pressure regulator 79 is adjusted to give a force on the upper end of the piston 71, which will now be in actuality the lower end of the cylinder 72, so that the weight of the head 15, chuck 17, and the electrode 12 is balanced by the force of the air pressure in conduit 94. This might be anywhere between 2 and 16 psi, for example, in the actual disintegrator constructed in accordance with the invention. The retraction of the electrode 12 away from the workpiece still takes place by action of high pressure air through pressure regulator 78 and through the selector valve 81V when actuated by solenoid coil 81 and with air pressure of a high value in the conduit 83.

It will be noted that many different urging forces are present on the electrode 12. The action of gravity on the head 15, chuck 17, and electrode 12 is in a direction toward the workpiece in the position shown in the drawing. However, when the head works underneath the workpiece this will be an urging force away from the workpiece 12. The action of the vibrator 21 is a vibratory force which is predominantly in a direction toward the workpiece 13. The air pressure in conduit 83 and on the lower end of the piston 71 is a force which counterbalances the weight of the head 15 when in the position shown. Also the coolant flow, especially when the electrode 12 is deep within an aperture 19, provides a reaction force which tends to move the electrode 12 away from the workpiece 13. Finally the high pressure from the pressure regulator 78 and through the selector valve 81V when actuated is an urging force which retracts the electrode 12 away from the workpiece.

The control means for the electrode movement control is provided by the solenoid actuated selector valve 81V and the air pressure regulators 77 and 78 are operating from the air pressure source 73. This solenoid selector valve is responsive to an input from the sensing transformer 50 to effect a retraction of the electrode from the workpiece upon the arc current exceeding a predetermined magnitude as determined by the moving arm 53. The entire electrode movement control provides feed movement toward the workpiece and controlled retraction away from the workpiece. This entire electrode movement for both the feed and retraction is a quite inexpensive system, considerably less expensive than the usual oil or oil/air servomotor control used with electric welders. Also the low friction of the piston 71 and the low mass and friction of the selector valve 81V provide rapid action despite use of low air pressures in the order of 15 psi and low rates of flow in the order of 1/4 cubic inch or air per minute.

If the electrode should weld to the workpiece 13 and thus be prevented from movement by air pressure on the bottom of the piston 71, then the timer relay 61 is brought into use. This may be set at a variable time which will not cause damage to the electrical components, for example 2 or 3 seconds. The short circuit current flowing through the sensing transformer will actuate the solenoid coil 81. This actuates the selector valve 81V applying high pressure which would be about 40 psi in the above example. This high pressure normally will retract the piston 71 upwardly. However, where the electrode is welded to the workpiece, this movement of the piston is prevented and pressure is rapidly built up within the bottom of the cylinder 72. This actuates the pressure switch 63 to close the pressure switch contact 63C and energize the timer 61. After a time delay of 2 or 3 seconds, for example, this opens the normally closed contact 61C to de-energize the main contactor 38. This de-energizes the entire arc disintegrator 11.

Additionally, the timer 61 may come into use in a different manner. If the manual valve handle 91 is moved to the dotted line up position, then high air pressure comes through pressure regulator 78 and the manual valve 89 to the conduit 83. This retracts the piston 71 upwardly until it strikes the upper end of the cylinder 72. When this happens, the high pressure will cause a buildup of pressure on the conduit 83 actuating the pressure switch 63 and closing contact 63C. This energizes the timer relay 61, and after a time delay, opens the contact 61C to de-energize the entire system.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. An electrode movement control for an electric arc discharge apparatus comprising in combination, a frame,
    means mounting an electrode for movement in said frame,
    means to supply electric arc current to said electrode and through said electrode to arc to a workpiece, first means urging said electrode mounting means in a first direction toward a workpiece,
    second means urging said electrode mounting means in a second direction away from a workpiece,
    at least one of said urging means including a fluid pressure motor connected to said electrode mounting means,
    one of said urging means including means supplying fluid under pressure to said motor to urge said mounting means in one of said directions,
    means responsive to the current exceeding a predetermined magnitude,
    control means having an input from said current responsive means and connected to control said motor to effect a retraction of said electrode from the workpiece upon the arc current exceeding said predetermined magnitude, and vibrating means in said first urging means and connected to apply to said electrode mounting means a force in said first direction greater than in said second direction.

2. An electrode movement control as set forth in claim 1 including means mounting the electrode in a position to be acted on by gravity as part of said first urging means.

3. An electrode movement control as set forth in claim 1 wherein said vibrating apparatus includes a movable armature, spring means urging said armature in one direction, and an electrically energizable coil acting on said armature to urge it in the opposite direction to impact against an anvil connected to said electrode mounting means with greater force in said first direction than in said second direction.

4. An electrode movement control as set forth in claim 1 including an electrode head movable along an axis on said frame, said electrode mounting means mounted on said head to mount an electrode along said axis, a first fluid pressure regulator variable to change the fluid pressure in said motor to substantially balance any unbalanced weight of the electrode head together with said electrode mounting means and an electrode.

5. An electrode movement control as set forth in claim 4 including a second variable fluid pressure regulator connecting said fluid pressure supply to said motor to supply a regulated fluid pressure higher than that of said first regulator to said motor to retract the electrode from the workpiece upon the arc current exceeding said predetermined magnitude.

6. An electrode movement control as set forth in claim 5 including a third variable fluid pressure regulator connecting said fluid pressure supply to said motor to supply a force urging the electrode toward the workpiece when the electrode head is positioned beneath the workpiece and tends to move away from the workpiece by action of gravity.

7. An electrode movement control as set forth in claim 1 wherein said control means includes a selector valve controlling air pressure to said motor, a solenoid connected to actuate said valve, and means connecting said current responsive means to actuate said solenoid.

8. An electrode movement control as set forth in claim 1 wherein said second urging means includes directing a coolant through a hollow electrode to react against the workpiece.

9. An electrode movement control as set forth in claim 1 wherein said second urging means includes a piston and a cylinder in said fluid motor, and said fluid pressure supplying means supplying air under pressure to a first end of said cylinder to urge said electrode mounting means in said second direction.

10. An electrode movement control as set forth in claim 9 wherein said fluid is air and including a variable aperture air bleed to atmosphere from said second end of said cylinder.

11. An electrode movement control as set forth in claim 10 including a variable aperture air bleed to atmosphere from said first end of said cylinder.

12. An electrode movement control as set forth in claim 1 including a solenoid actuated valve controlling fluid flow to said motor and wherein said current responsive means includes a current sensing transformer having a primary connected in series with said arc current supply means to energize said solenoid upon exceeding a given level of arc current to retract said electrode from the workpiece.

* * * * *